United States Patent Office
3,222,394
Patented Dec. 7, 1965

1

3,222,394
HYDROGENATED DIFUNCTIONAL ACIDS
Stanley P. Rowland and Ervin G. Pritchett, Cincinnati, Ohio, assignors to National Distillers and Chemical Corporation, New York, N.Y., a corporation of Virginia
No Drawing. Filed Dec. 13, 1961, Ser. No. 159,165
2 Claims. (Cl. 260—515)

The present invention relates to novel chemical compounds and to a process for their manufacture. More particularly, the present invention relates to polymerized derivatives of dialkali metal hydrocarbon compounds in which each of the two alkali metal atoms is linked to a different carbon atom in an aliphatic hydrocarbon group or in an aliphatic hydrocarbon chain that may contain aromatic, e.g., phenyl, substituents. Still more particularly, the invention relates to high molecular weight dialkali metal polymerized hydrocarbons and to the production therefrom of saturated high molecular weight dibasic acids.

Novel compounds embodied by the present invention are high molecular weight dibasic acids that are essentially free of aliphatic unsaturation and that are prepared from the substantially difunctional polymers described in detail in copending application S.N. 75,907 (filed Dec. 15, 1960). They are valuable as raw materials for plastics, rubbers, foams, adhesives, coatings, and the like. More specifically, they are dibasic acid derivatives of dialkali metal polymeric hydrocarbons in which the polymeric hydrocarbon group has a molecular weight of at least about 300, each alkali metal atom is linked to a different carbon atom in an aliphatic chain or in an aromatic-substituted aliphatic hydrocarbon chain, and the polymeric hydrocarbon group contains more than two units of a monomer from the group consisting of aliphatic conjugated diolefins, styrene, and alkyl-substituted styrenes. These novel dibasic acids are made by the carbonation of polymers which were made by addition of molecular units of a monomer to a relatively low molecular weight dialkali metal hydrocarbon until a higher molecular weight dialkali metal hydrocarbon, having a molecular weight in excess of about 300, has been built up. In a specific illustration, a sufficient amount of butadiene is reacted with a mixture of isomeric disodiooctadienes (containing straight chain and branched chain isomers) to yield a disodiopolybutadiene of the desired molecular weight. The disodiopolybutadiene is then carbonated, for example by reaction with carbon dioxide, followed by hydrolysis and hydrogenation to yield the corresponding saturated dibasic acid.

The process embodied herein is particularly well adapted to the use of dilithiooctadiene, mixtures of isomeric disodiooctadienes, or disodiodiphenylbutane as the low molecular weight dialkali metal hydrocarbon and to butadiene or styrene as the monomer to be added thereto. The process of this invention, however, is in general applicable to addition products of saturated or unsaturated dialkali metal hydrocarbons with aliphatic diolefins, styrene, or substituted styrenes. For example, the starting material utilized for practice of this invention may be a dialkali metal dimer of an aliphatic conjugated diolefinic hydrocarbon such as butadiene, isoprene, 1,3-pentadiene, and the like or of an aromatic compound containing an olefinic substituent such as styrene or alkyl-substituted styrene, such as α-methylstyrene, vinyltoluene, and so forth.

The low molecular weight dialkali metal hydrocarbon starting materials of this invention may, for example, be an isomeric mixture of disodiooctadienes prepared by treating butadiene with finely dispersed sodium, prefer-

2 ably a dispersion thereof in which the particle size of the sodium does not exceed about three microns, in a selected liquid medium, such as dimethyl ether, and, if desired, in the presence of a relatively small amount of a polycyclic aromatic hydrocarbon, such as anthracene, benzophenone, naphthalene, or terphenyl, and/or in the presence of a selected solid, friable attrition agent at a temperature preferably below about 0° C., or it may be disodiodiphenylbutane prepared similarly from styrene. Processes for preparing such alkali metal hydrocarbons are disclosed in, for example, U.S. Patent Nos. 2,816,913, 2,816,914, 2,816,916, 2,816,917, and 2,816,936.

In accordance with the preferred embodiment of this invention, the lower molecular weight dialkali metal hydrocarbon is reacted with a monomer such as, for example, butadiene, styrene, or the like. In another embodiment of this invention, a finely-dispersed alkali metal, such as sodium or, preferably, lithium, is reacted with a monomer, such as butadiene or styrene, to form a dialkali metal hydrocarbon, for example by a process such as is disclosed in U.S. Patent No. 2,816,913. The addition of monomer is continued until a dialkali metal polymeric hydrocarbon of the desired molecular weight has been built up. The monomer with which the lower molecular weight dialkali metal hydrocarbon is reacted may be the same as the monomer used in making the lower molecular weight dialkali metal hydrocarbon or different from it.

The polymerization reaction suitably is conducted in the presence of a liquid reaction medium which essentially contains certain types of ethers. The ether medium may be any aliphatic mono ether having a methoxy group in which the ratio of the number of oxygen atoms to the number of carbon atoms is not less than 1:4. Examples include dimethyl ether, methyl ethyl ether, methyl n-propyl ether, methyl isopropyl ether, and mixtures of these methyl ethers. Certain aliphatic polyethers are also satisfactory. These include the acyclic and cyclic polyethers which are derived by replacing all of the hydroxyl hydrogen atoms of the appropriate polyhydric alcohol with alkyl groups. Examples are the ethylene glycol dialkyl ethers such as the dimethyl, methyl ethyl, diethyl, methyl butyl, ethyl butyl, dibutyl, and butyl lauryl ethylene glycol ethers; trimethylene glycol dimethyl ether, glycerol trimethyl ether, glycerol dimethyl ethyl ether, and the like. Generally, simple methyl monoethers such as dimethyl ether and the polyethers of ethylene glycols such as ethylene glycol dimethyl ether are preferred.

Although it is preferred that the reaction medium for the polymerization reaction consist substantially of the ethers as specified, other inert liquid media can be present in limited amounts, replacing for example from about 5 to about 50 percent of the ether. Examples of these inert media include hexane, benzene, alkylate, triethylamine, and mixtures thereof.

The polymerization reaction is generally carried out at a temperature between about the reflux temperature of the liquid reaction medium and about —60° C. or lower, and is preferably between about reflux temperature and —40° C.

The amount of monomer added to the lower molecular weight dialkali metal hydrocarbon depends upon the molecular weights of the reactants and upon the desired molecular weight of the polymerized product. In general, the desired molecular weight of the dialkali metal polymeric hydrocarbon product lies between about 300 and several hundred thousand, preferably 500 to 5,000 for many applications. Thus, regarding the relative amounts of reactants to employ, and in the case of reacting the alkali metal with the monomer, use is made of an excess of the monomer over mole to mole ratio with the alkali metal. That is, the total amount of monomer that is employed until completion of the reaction is in excess of one mole of the monomer per mole of alkali metal, the excess of monomer employed being, as aforesaid, dependent upon its molecular weight and the desired molecular weight of the polymerized product.

The polymers of this invention contain sufficient units of the selected monomer to give a product having the desired molecular weight, that is, the molecular weight that will make the polymer most suitable for the desired ultimate use. To illustrate, a polymeric dicarboxylic acid intended to be used in co-reaction with diisocyanates for rigid or semi-rigid foams will preferably have a molecular weight in the range of about 300 to 800. Polymers intended for use as flexible foams will suitably have molecular weights in the range of about 1,000 to 4,000. The molecular weight range for difunctional polymers to be used in coatings or in elastomers for casting resins is suitably about 1,000 up to about 10,000 or up to about several hundred thousand for millable rubbers.

The polymeric dicarboxylic acids of this invention may be esterified with glycols or polyols, such as glycerols, pentaerythritol, etc., to convert terminal carboxyl groups to hydroxyl end groups with or without substantial increase in molecular weight through esterification and polyesterification. These hydroxyl-terminated products may be employed with diisocyanates for the preparation of elastomers, foams, adhesives, and coatings.

In preferred practice of this invention, the lower molecular weight dialkali metal dimerized hydrocarbon is formed prior to the addition of the monomer for polymerization. It is possible, however, in another embodiment of this process to form the lower molecular weight dialkali metal dimerized hydrocarbon during the addition of the monomer, that is, to start with a monomer and an alkali metal and to continue feeding the monomer into the system until the desired dialkali metal polymeric hydrocarbon is formed, without stopping the reaction at the dialkali metal hydrocarbon dimer stage. The present process may be carried out either in a continuous, semicontinuous, or batchwise manner, and it is not intended to limit the process to any particular method of operation.

The higher molecular weight dialkali metal polymeric hydrocarbons of this invention can be converted into dibasic acids by reacting a suitable compound with such a higher molecular weight dialkali metal polymeric hydrocarbon. Such a dibasic acid-forming reactant may be any suitable carbonating agent, such as for example, carbon dioxide.

At least two equivalents of the carbonating reactant are required for each molecule of the dialkali metal polymeric hydrocarbon. In order to insure complete reaction for dibasic acid formation, an excess of the carbonating agent is usually employed; for example, when using carbon dioxide the excess may be up to about 400 percent, and is preferably from about 10 percent to about 50 percent.

Carbonation of the mixture containing the products yields the salts of polymeric dibasic acids. The carbonation may be carried out by any convenient means, for example by subjecting the dimetallic diene derivatives to dry gaseous carbon dioxide, by contact with solid carbon dioxide, or by means of a solution of carbon dioxide. This carbonation forms the dimetallic salts of the unsaturated polymeric dibasic acids. These salts contain two more carbon atoms than the dimetallic diene polymers from which they are produced.

It is important when producing the diacids and their salts to carry out the polymerization and carbonation as two separate steps. The dimetallic diene polymer is made first, and the carbonation is carried out as soon afterwards as possible. If carbon dioxide is present during the polymerization, the reaction is neither so selective nor so complete.

The diacid salts of the lower molecular weight acid are water-soluble or water-dispersible and may be separated by aqueous caustic extraction. Alternatively, they may be converted to the free acids with a hydrolyzing agent, e.g., aqueous acid, an alcohol such as methanol or ethanol, etc., to destroy any unreacted alkali metal and to liberate the dibasic acids from their dialkali metal derivatives which are initially formed. The dibasic acids are isolated from this reaction mixture by extraction, distillation, or other suitable means. The resulting dibasic acids have molecular weights ranging from about 300 up to several hundred thousand, depending upon the operating conditions.

The carbonation reaction may, if desired, take place in the presence of a liquid reaction medium, such as an ether. When an ether is used, it is preferably selected from the aforelisted group of ethers suitable as reaction media for the addition or polymerization step. The specific ether used in the carbonation step is, however, not necessarily the same ether as that employed in the formation of the higher molecular weight dialkali metal polymeric hydrocarbon, although for convenience the same ether generally is selected. Other useful reaction media include hexane, alkylate, benzene, triethylamine, and the like, and mixtures thereof.

The reaction of the higher molecular weight dialkali metal polymeric hydrocarbon with the appropriate carbonating agent is generally carried out at a temperature between about the reflux temperature of the selected reaction medium and about $-60°$ C., or lower, and is preferably between about the reflux temperature and about $-40°$ C. When no ether is used, however, the upper limit of operable temperatures can be higher, for example, as high as about $100°$ C.

During the entire operation, that is, polymerization as well as acid formation, it is important that the presence of moisture and compounds containing active hydrogen be carefully controlled in order to keep to a minimum the formation of monocarboxyl compounds. It is also necessary to exclude other materials that would be reactive to the dialkali metal adduct. The reaction, therefore, should be conducted in an inert atmosphere to exclude moisture; oxygen; carbon dioxide; compounds containing active hydrogen, such as alcohols, esters, amines containing H on the N, and the like; and other impurities. The reaction preferably is carried out in an atmosphere of nitrogen or other inert gas, such as helium or argon.

The higher molecular weight unsaturated dibasic acids or their salts or other derivatives may then be hydrogenated at the double bonds to yield the corresponding saturated compounds, particularly the saturated polymeric dibasic acids. Such high molecular weight dicarboxylic acids are colorless, fluid polymers. The hydrogenation is generally catalytic; preferred catalysts are nickel or palladium, although other conventional hydrogenation catalysts, such as for example copper-chromite, cobalt-molybdenum, and the like, can be used.

Hydrogenation is effectively carried out at pressures of about 50 to 5,000 p.s.i. and at temperatures of from ambient to about $300°$ C., depending upon the catalyst and the solvent employed. Pressures of about 500 to 1,000 p.s.i. and temperatures of about 130 to $250°$ C. are preferred in order to obtain reasonable and controlled rates of reaction. Although a solvent is not necessary to the hydrogenation, the use of a solvent serves to lower the viscosity of the reaction mixture and to increase contact with the catalyst. Any solvent that is not reactive to the dibasic acids may be used, such as hydrocarbons; lower aliphatic acids, e.g., acetic acid; and ethers, e.g., dioxane and tetrahydrofuran; and mixtures thereof. In addition, the solvent must remain liquid at the selected reaction temperature and yet be readily stripped from the product. Concentration of the solvent may vary from zero to about 95 percent of the mixture, and concentrations of about 30 to 70 percent are preferred for ease of handling and product recovery.

The following general equations are presented to illustrate the mechanism of the process of this invention, using butadiene and styrene to represent the reactants:

(1)
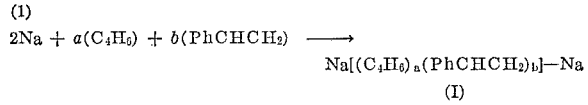

(2)
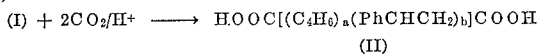

(3)
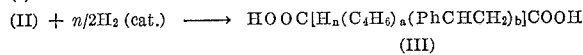

where (I) is a dialkali metal polymerized hydrocarbon; (II) is a high molecular polymeric acid; (III) is the saturated high molecular weight dibasic acid product of this invention; $a$ is a whole number of at least 2, and preferably 2 to about 200; $b$ is 0 or a whole number of 1 to $9a$ inclusive, and preferably 0 up to about 1800; the ratio of $b$ to $a$ is 0 to 9; and $n$ is a whole number ranging from about $a$ to $2a$, and preferably about $1.5a$ to $2a$. The hydrogenation, as shown in Equation 3, occurs essentially with the diolefinic segment of the main polymer chain.

Accordingly, the hydrogenated high molecular weight dibasic acids of this invention have the general formula $$HOOC[H_n(A)_a(B)_b]COOH$$

wherein A is a diolefin radical, B is a radical selected from the group consisting of styrene and alkyl-substituted styrenes, $a$ is a whole number of at least 2, $b$ is 0 or a whole number of 1 to $9a$ inclusive, and $n$ is a whole number ranging from about $a$ to $2a$. The molecular weight of these compounds is at least 300, and generally is in the range of about 300 to about 20,000.

The unsaturated polymeric dibasic acid may be catalytically hydrogenated up to about 90 to 97 percent of completion to produce substantially saturated products that are equivalent to the unsaturated dibasic acid in such properties as carboxyl content, carboxyl reactivity, viscosity, solubility, and the like, and that are appreciably superior to their corresponding unsaturated dibasic acids in such properties as color; color retention; and resistance to oxidation, light-catalyzed deterioration, heat, alkali, and the like. These properties carry over into the fabricated products of the hydrogenated polymeric dibasic acids. The saturated polymeric acids are particularly suited for use in preparing polyesters, alkyds, and polyurethans of all types; thus these acids are attractive for applications such as binders for solid propellant rocket fuels, foams, coatings, films, fibers, adhesives, rigid plastics, etc.

A specific application for which these saturated dibasic acids are suited is that of hydrocarbon-soluble corrosion inhibitors. Saturated dibasic acids prepared from butadiene or isoprene and having molecular weights in the range of 300 to 600 are readily convertible to amine salts which show superior solubility in non-polar solvents. More effective in this type of application are the imidazolines produced from these saturated high molecular weight dibasic acids and ethylene diamine or diethylene triamine and the like; these basic derivatives of the saturated dicarboxylic acids of this invention exhibit corrosion-inhibiting and antioxidant properties together with high solubility in hydrocarbon systems.

Esters derived from the saturated dibasic acids of this invention are particularly useful as softeners and plasticizers for synthetic rubbers. Esters derived from alcohols ranging from methyl alcohol to decyl alcohol are especially effective as softening agents for rubber compositions when the molecular weight of the dibasic acid lies in the range of 1,000 to 2,000. Similar esters having molecular weights in the range 500 to 1,000 have good lubricating properties and hydrocarbon compatibility.

Polyesters based on the saturated dibasic acids having molecular weights above about 500 are useful as caulking and sealing compositions; such polyesters based on ethylene glycols, propylene glycol, and butene glycol are particularly attractive in view of improved weathering performance and hydrolytic stability.

As indicated above the saturated dibasic acids of this invention may be converted to polyurethans directly by reaction with diisocyanates or following a preliminary reaction of the carboxyl groups with glycols or polyols to produce terminal hydroxyls in the place of the carboxyl group. Such polyurethans may be employed in coatings, cast elastomers, and foams. Foams from these compositions are generally flexible when the saturated resinous acid is derived from butadiene, isoprene, or the like; the foams are rigid when the dibasic acid contains substantial or major amounts of units derived from styrene, alpha-methyl styrene, etc.

Alkyd resins also may be prepared from the dibasic acids of this invention. The saturated dibasic acids containing substantial or major amounts of monomer units derived from styrene, alpha-methyl styrene, or vinyl toluene, etc., are particularly useful components for non-drying alkyds that are to be employed in combination with urea-formaldehyde and melamine-formaldehyde resins in baking enamels. In such application these dibasic acids contribute attractive color stability to the baking finish.

These saturated dibasic acids, such as one derived from butadiene and having a molecular weight in the range of 500 to 2,000, are particularly useful for conversion to polyamides by reaction with ethylene diamine, diethylene triamine, ethanol amine, or methyldiethanol amine. Such compositions are useful in hot-melt adhesives, in printing inks, and in adhesives (employing combinations of these polyamides with epoxy compounds).

The more detailed practice of the invention is illustrated by the following examples wherein parts are given by weight unless otherwise specified. These examples and embodiments are illustrative only, and the invention is not intended to be limited thereto except as indicated by the appended claims.

*Example 1*

To a reaction vessel equipped with a Dry-Ice cooled condenser terminated with a nitrogen purge, a low-temperature thermometer, a gas-inlet tube, and an agitator were charged the following in the order listed: 3.0 parts of p-terphenyl, 2,000 parts of dimethyl ether, and 15.2 parts of a fine dispersion of sodium in purified kerosene (3.8 parts of sodium having a maximum particle size of about three microns).

Within 15 minutes at $-30°$ C., a blue color developed in the reaction mixture, indicating the formation of a sodio-terphenyl complex. 1,3-butadiene (17.8 parts) was added to yield disodiooctadiene (0.165 mole). After 30 minutes 130 parts of 1,3-butadiene was introduced into the reaction mixture at the rate of 2 parts per minute while maintaining the temperature at about $-30°$ C. and agitating vigorously. Upon completion of the butadiene addition, the reaction mixture was stirred for an additional 15 minutes at about $-30°$ C. A 98 percent yield of disodiopolybutadiene was obtained. The product, unstable to air, was reacted with water for purposes of identification. The resulting hydrocarbon oil was highly unsaturated (Hanus iodine number 405 and hydrogenation number 450 [1]) and had an intrinsic viscosity of 0.07 in xylene at 23° C.

One hundred and forty-seven parts of the disodiopolybutadiene was reacted with a large excess of finely powdered, solid carbon dioxide and then treated with steam. Five hundred parts of toluene and 35 parts of 36% hydrochloric acid were added, and the mixture

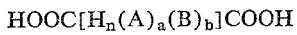

[1] Grams of iodine equivalent to the moles of hydrogen absorbed by 100 grams of sample.

was stirred at 60° C. for one hour to assure complete acidification. Upon evaporation of the toluene from this solution, there was obtained 150 parts of a viscous liquid product. This product had an acid number of 60, corresponding to a dibasic acid of molecular weight 1,870. This high molecular weight unsaturated dibasic acid is particularly attractive as a raw material for long-oil alkyd resins designed for exterior coatings and printing inks.

*Example 2*

One hundred and fifty-two parts of a carboxyl-terminated polybutadiene obtained by carbonation of a dilithiopolybutadiene prepared by the method of Example 1, using lithium instead of sodium, and having a neutral equivalent of 872, a microhydrogenation number of 384 [2] a viscosity of 934 stokes at 25° C., a density of 0.906 g./ml., a Gardner color of 2, and a intrinsic viscosity of 0.104 in xylene at 23° C., was mixed with 151 parts of peroxide-free dioxane and 7.5 parts of palladium (5 percent)-on-carbon in an autoclave. The mixture was stirred and heated in a hydrogen atmosphere at 150° C. and 500 to 750 p.s.i. for 26 hours. Approximately 1,100 p.s.i. of hydrogen was consumed. After filtration and removal of the dioxane solvent, the liquid product had a neutral equivalent of 884, a microhydrogenation number of 55.4, a viscosity of 1140 stokes at 25° C., a density of 0.853 g./ml., a Gardner color of 1, and an intrinsic viscosity of 0.052 in xylene at 23° C. The change in microhydrogenation number indicated a hydrogenation of 86 percent of the original unsaturation; the infrared spectrum revealed only traces of unsaturation to remain.

*Example 3*

A sample of resinous dibasic acid prepared by the procedure described in Example 1 and having a molecular weight of 1,610 was hydrogenated by the procedure described in Example 2. The saturated dibasic acid was converted to a resinous polyamide by coreaction with 1.2 moles of diethylene triamine. The high-viscosity, light-colored product (1 part) was dissolved in 3 parts each of various polyepoxides. Each composition was cast into a specimen approximately 70 mils thick and cured overnight at 125° C. The products were very flexible and tough, especially the combination based on bisphenol A-epichlorohydrin resin (bisphenol A=4,4'-isopropylidene diphenol). Other diepoxides such as vinyl cyclohexene dioxide and the epichlorohydrin derivatives of polyphenols also yielded insoluble, thermoset plastic compositions having attractive color, flexibility, and toughness.

*Example 4*

To a reaction vessel equipped with a Dry-Ice cooled and nitrogen-purged condenser, a low-temperature thermometer, a gas inlet tube, and an agitator were charged the following materials in the order listed: 3.0 parts of naphthalene, 1,950 parts of dimethyl ether, 2.34 parts of a fine dispersion of lithium (0.7 part of metal) in mineral oil, and 10.5 parts of styrene in an equal volume of mineral oil. The mixture was stirred for 15 minutes at −33° C. Ninety parts of styrene was then added to the dilithiodiphenylbutane thus formed over a period of 30 minutes at an average temperature of −32° C. Following a 30-minute holding period at −30° C. the dilithiopolystyrene was contacted and reacted with a large excess of finely powdered, solid carbon dioxide and then treated with steam. The resinous acid, which was isolated by the procedure described in Example 1, was a hard, rosin-like, light yellow product having an acid number of 45 and an apparent molecular weight of 2,500. This polymeric acid was soluble in aromatic solvents and was especially appropriate for the preparation of rapid-drying polyester coatings and alkyd resins.

*Example 5*

Fifty parts of a dibasic acid prepared by the procedure described in Example 1 and having a molecular weight of 3,760, a viscosity of 930 stokes at 25° C., and a Hanus iodine number of 390 was dissolved in 50 parts of dioxane and hydrogenated over 5 parts of 5% palladium-on-carbon catalyst at 100°–110° C. and at 750 p.s.i. of hydrogen for 8 hours. The crude product from the hydrogenation was filtered to remove the catalyst and subjected to reduced pressure to remove the solvent. There was obtained 50.1 parts of a fluid dibasic acid having a molecular weight of 3,860, a viscosity of 990 stokes at 25° C., and a Hanus iodine number of 98. This saturated polymeric dibasic acid is particularly useful in preparing resinous polyesters and polyamides for adhesive aplications.

While there are above disclosed but a limited number of embodiments of the invention herein presented, it is possible to produce still other embodiments without departing from the inventive concept herein disclosed. It is desired, therefore, that only such limitations be imposed on the appended claims as are stated therein.

What is claimed is:

1. Saturated high molecular weight derivatives of carboxyl-terminated polymerized hydrocarbons prepared by the process which comprises reacting with hydrogen at pressures of about 50 to 5,000 p.s.i. and temperatures of about ambient to 300° C., in the presence of a catalyst selected from the group consisting of nickel, copper-chromite, cobalt-molybdenum, and palladium, unsaturated high molecular weight derivatives of carboxyl-terminated polymers, said unsaturated polymers having been prepared by the steps of (1) reacting a finely-divided alkali metal in an inert liquid reaction medium at a temperature between about reflux temperature of said reaction medium and about −60° C. with at least one hydrocarbon monomer selected from the group consisting of acyclic aliphatic conjugated diolefins, acyclic aliphatic conjugated diolefins in combination with styrene, and acyclic aliphatic conjugated diolefins in combination with an alkyl substituted styrene in substantial excess of a mole-to-mole ratio with the alkali metal to obtain a dialkali metal adduct of a polymer of said monomer, said polymer having a molecular weight in excess of about 300, and (2) reacting the so-formed dialkali metal polymerized hydrocarbon with carbon dioxide.

2. The product of claim 1 wherein the monomer is butadiene.

References Cited by the Examiner

UNITED STATES PATENTS

| | | | |
|---|---|---|---|
| 2,811,551 | 10/1957 | Coffman et al. | 260—515 X |
| 2,816,914 | 12/1957 | Frank et al. | 260—515 |
| 3,013,071 | 12/1961 | Frank et al. | 260—537 |
| 3,108,994 | 10/1963 | Zelinski et al. | 260—94.7 X |

LORRAINE A. WEINBERGER, *Primary Examiner.*

CHARLES B. PARKER, *Examiner.*

---

[2] Microhydrogenation number is determined by hydrogenation over a large excess of Adam's catalyst and is converted to numbers equivalent to those to those of "Iodine number."